US012755119B2

(12) United States Patent
Chen et al.

(10) Patent No.: US 12,755,119 B2
(45) Date of Patent: Oct. 6, 2026

(54) METHOD AND APPARATUS FOR PROCESSING GRAPHIC SYMBOL AND COMPUTER-READABLE STORAGE MEDIUM

(71) Applicant: CONTEMPORARY AMPEREX TECHNOLOGY (HONG KONG) LIMITED, Hong Kong (CN)

(72) Inventors: Xiaoyi Chen, Ningde (CN); Fei Chen, Ningde (CN); Guannan Jiang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 161 days.

(21) Appl. No.: 18/517,022

(22) Filed: Nov. 22, 2023

(65) Prior Publication Data

US 2024/0086661 A1 Mar. 14, 2024

Related U.S. Application Data

(63) Continuation of application No. PCT/CN2023/092278, filed on May 5, 2023.

(30) Foreign Application Priority Data

Jul. 22, 2022 (CN) ......................... 202210869883.4

(51) Int. Cl.
*G06K 7/14* (2006.01)

(52) U.S. Cl.
CPC .................................... *G06K 7/146* (2013.01)

(58) Field of Classification Search
CPC ...................................................... G06K 7/146
USPC ................................ 235/462.01–462.49, 469
See application file for complete search history.

(56) References Cited

U.S. PATENT DOCUMENTS

2006/0091221 A1* 5/2006 He ....................... G06Q 10/087 235/470
2007/0019257 A1 1/2007 Li
2012/0080515 A1* 4/2012 Van Der Merwe .. G06K 7/1447 235/375
2012/0118969 A1* 5/2012 Zolotov ............... G06K 7/1478 235/462.04

(Continued)

FOREIGN PATENT DOCUMENTS

CN 104463795 A 3/2015
CN 107545207 A 1/2018

(Continued)

OTHER PUBLICATIONS

Partial Supplementary European Search Report issued Jul. 24, 2024 in European Patent Application No. 23762124.8.

(Continued)

*Primary Examiner* — Suezu Ellis
(74) *Attorney, Agent, or Firm* — XSENSUS LLP

(57) ABSTRACT

A method for processing graphic symbol includes obtaining a luminance component image of a to-be-processed image, performing binarization processing based on the luminance component image of the to-be-processed image to obtain a binarized image, and performing a grayscale morphological operation based on the binarized image to obtain a target image, wherein the to-be-processed image has a graphic symbol.

18 Claims, 4 Drawing Sheets

200

(56) References Cited

U.S. PATENT DOCUMENTS

| | | | | |
|---|---|---|---|---|
| 2012/0173347 | A1 | 7/2012 | De Almeida Neves et al. | |
| 2012/0301033 | A1* | 11/2012 | Fukunaga | G06T 5/73 382/195 |
| 2013/0057753 | A1* | 3/2013 | Gillet | G03B 13/36 348/E5.045 |
| 2015/0248571 | A1* | 9/2015 | Tao | G06F 3/0482 235/462.1 |
| 2021/0397916 | A1* | 12/2021 | Satish | G06K 7/1452 |

FOREIGN PATENT DOCUMENTS

| | | | | |
|---|---|---|---|---|
| CN | 108108761 | A | 6/2018 | |
| CN | 108197521 | A | 6/2018 | |
| CN | 108345816 | A | 7/2018 | |
| CN | 111783494 | A | 10/2020 | |
| CN | 113781338 | A | 12/2021 | |
| CN | 114757950 | A | 7/2022 | |
| CN | 115829848 | A | 3/2023 | |
| JP | 2014-057234 | A | 3/2014 | |
| WO | WO-2009148409 | A1 * | 12/2009 | G06K 7/1093 |

OTHER PUBLICATIONS

Wu, Quian et al., "Research on QR Code Image Processing on the LED Screen", Proceedings of the Spie, vol. 11915, Sep. 15, 2021.

Office Action issued Jul. 23, 2025 in Chinese Patent Application No. 202210869883.4 with English translation thereof.

International Search Report and Written Opinion mailed on Jul. 19, 2023, received for PCT Application PCT/CN2023/092278, filed on May 5, 2023, 19 pages including English Translation.

* cited by examiner

METHOD AND APPARATUS FOR PROCESSING GRAPHIC SYMBOL AND COMPUTER-READABLE STORAGE MEDIUM

CROSS-REFERENCE TO RELATED APPLICATIONS

This application is a continuation of International Application No. PCT/CN2023/092278, filed May 5, 2023, which claims priority to Chinese Patent Application No. 202210869883.4 entitled "METHOD AND APPARATUS FOR PROCESSING GRAPHIC SYMBOL AND COMPUTER-READABLE STORAGE MEDIUM" filed on Jul. 22, 2022, each of which is incorporated herein by reference in its entirety.

TECHNICAL FIELD

This application relates to the field of image processing technologies, and more specifically, to a method and apparatus for processing graphic symbol and a computer-readable storage medium.

BACKGROUND

Images containing quick codes (Quick Code, QS) and bar codes (Bar code, BS) captured in a real environment may be affected by external environmental factors such as stains and lighting, and the resulting images may have uneven luminance, stains, noise, and the like and thus are difficult to decode correctly. Therefore, it is often necessary to restore the captured image to correctly recognize the information contained in the image.

In the prior art, trained deep learning models are often used for image restoration. However, deep learning models need to be trained with a large amount of data before they can be applied, and the training process is tedious and data-dependent, which affects the efficiency of image restoration.

SUMMARY

Embodiments of this application provide a method and apparatus for processing graphic symbol and a computer-readable storage medium so as to improve the efficiency of image restoration.

According to a first aspect, a method for processing graphic symbol is provided. The method includes: obtaining a luminance component image of a to-be-processed image, performing binarization processing based on the luminance component image of the to-be-processed image to obtain a binarized image, and performing a grayscale morphological operation based on the binarized image to obtain a target image; where the to-be-processed image has a graphic symbol.

In the foregoing implementation, a high-quality target image can be obtained by extracting the luminance component image of the to-be-processed image captured by an image capture device and performing binarization processing and morphological operation based on the luminance component image. In this way, the graphic outline contained in the target image is clear and less noisy, which is conducive to improving the accuracy and efficiency of subsequent graphic recognition.

In some possible implementations of the first aspect, the obtaining a luminance component image of a to-be-processed image includes: converting a color space of the to-be-processed image to a target color space according to a mapping relationship between the color space of the to-be-processed image and the target color space; and extracting a luminance component image of the target color space to obtain the luminance component image of the to-be-processed image.

In the foregoing implementations, the color space of the to-be-processed image that originally includes no luminance component can be converted to the target color space that includes the luminance component image, thereby extracting the luminance component of the to-be-processed image.

In some possible implementations of the first aspect, the color space of the to-be-processed image may be RGB color space or BGR color space, and the target color space may be YCbCr color space, YCrCb color space, or YUV color space.

In the foregoing implementations, the image containing only the color component is mapped to the color space containing the luminance component, which makes the image mapping simpler and more robust and facilitates the recognition of regions of interest in the image.

In some possible implementations of the first aspect, the mapping relationship between the color space of the to-be-processed image and the target color space is shown in the following formula:

$$Y = k_r R + k_g G + k_b B$$

where Y is the luminance value of a pixel in the luminance component image of the target color space, and R, G, and B are the red chromaticity value, green chromaticity value, and blue chromaticity value of a pixel in an original image, respectively; and $k_r$, $k_g$, and $k_b$ are weighting factors and satisfy the following relationship:

$$k_r + k_g + k_b = 1$$

In the foregoing implementations, the image component of the to-be-processed image that contains the most adequate information about texture and structural features can be obtained, which facilitates subsequent processing and recognition.

In some possible implementations of the first aspect, before the performing binarization processing based on the luminance component image of the to-be-processed image, the method for processing graphic symbol further includes: performing image enhancement on the luminance component image of the to-be-processed image.

In the foregoing implementations, the visual effect of the image can be improved, the image can be made clearer, and the interpretation and recognition effect of the graphic symbol in the image can be enhanced.

In some possible implementations of the first aspect, the performing image enhancement on the luminance component image of the to-be-processed image includes: performing image enhancement on the luminance component image using a point operation algorithm.

In the foregoing implementations, the grayscale range occupied by the image data can be changed and the contrast of the features of interest can be extended.

In some possible implementations of the first aspect, the performing enhancement on the luminance component image of the to-be-processed image using a point operation algorithm includes: performing contrast stretching on the luminance component image of the to-be-processed image.

In the foregoing implementations, the grayscale can be adjusted according to the characteristics of the image, such that the contrast of the image is transformed to an appropriate range, and a difference in grayscales of different regions in the image is increased to facilitate the subsequent binarization processing.

In some possible implementations of the first aspect, the performing contrast stretching on the luminance component image of the to-be-processed image includes: traversing pixels in the luminance component image of the to-be-processed image, and determining grayscale values of all of the pixels in the luminance component image of the to-be-processed image; determining a contrast stretching function based on a grayscale range in which the grayscale values of all of the pixels in the luminance component fall; and performing grayscale transformation on the pixels in the luminance component image of the to-be-processed image based on the contrast stretching function.

In the foregoing implementations, the difference between the foreground and the background can be increased to make the features of interest more prominent.

In some possible implementations of the first aspect, the performing binarization processing based on the luminance component image of the to-be-processed image includes: performing binarization processing on the luminance component image of the to-be-processed image using a local adaptive binarization algorithm.

In the foregoing implementations, the performing binarization processing on the luminance component image of the to-be-processed image can remove light and dark information contained in a grayscale image and convert the grayscale image into a black-and-white image, which facilitates the processing and recognition of the image in the subsequent process.

In some possible implementations of the first aspect, the performing binarization processing on the luminance component of the to-be-processed image using a local adaptive binarization algorithm includes: determining a size of a binarization processing window; traversing all pixels in the luminance component image of the to-be-processed image using the binarization processing window; calculating a sum of pixel values of all of the pixels covered by the binarization processing window; determining a grayscale threshold to be covered by the binarization processing window; and under the condition that the sum of the pixel values is greater than or equal to the grayscale threshold, setting a pixel value of a pixel corresponding to the center of the binarization processing window to 1; otherwise setting the pixel value of the pixel corresponding to the center of the binarization processing window to 0. The grayscale threshold can be determined according to the following formula:

$$T = \frac{1}{n^2} \sum_{i=0}^{i=n-1} \sum_{j=0}^{j=n-1} v_{ij} - C$$

where T is the grayscale threshold, n is a length of a side of the binarization processing window, $v_{ij}$ is the grayscale value of the pixel in the i-th row and j-th column in the binarization processing window, and C is a constant term. A value of the constant term can be determined depending on actual image processing requirements. The optimal solution of the grayscale threshold T can be found by using a single variable control method, the Bayesian optimization method, or other parametric optimization methods.

In the foregoing implementations, a binarization threshold at each pixel position can be determined by the distribution of its surrounding neighborhood pixels instead of being fixed, such that a binarization threshold for a region with higher luminance increases, while a binarization threshold for an image region with lower luminance decreases accordingly. In this way, reasonable binarization can be performed on local image regions with different luminance, contrast, and texture. This reduces the influence of significant differences in pixel grayscale in local regions of an actually captured image due to uneven illumination in the image.

In some possible implementations of the first aspect, before the performing a grayscale morphological operation based on the binarized image, the image processing method further includes: performing filtering on the binarized image.

In some possible implementations of the first aspect, the performing filtering on the binarized image includes: performing edge-preserving filtering on the binarized image.

In the foregoing implementations, noise in the image can be filtered out, which facilitates image recognition, and the edge-preserving filtering can filter out as much noise as possible while retaining more edge details.

In some possible implementations of the first aspect, the performing edge-preserving filtering on the binarized image includes: converting the binarized image to an RGB image; performing color mean shift on all pixels on the RGB image; and converting the color-mean-shifted RGB image to a binarized image.

In the foregoing implementations, the binarized image can be made smoother, and a calculation amount of the morphological operation can be reduced.

In some possible implementations of the first aspect, the performing a grayscale morphological operation based on the binarized image includes: performing morphological closing and opening operations on the binarized image.

In the foregoing implementations, an area of the image can be kept unchanged while filtering the noise in the image.

In some possible implementations of the first aspect, the closing operation includes: selecting a first structural element based on the binarized image; and performing expansion processing and erosion processing on a closing operation region in the binarized image sequentially according to the first structural element and a predetermined closing operation rule.

In the foregoing implementations, small gaps that exist in bright colored regions of the image can be filled.

In some possible implementations of the first aspect, the opening operation includes: selecting a second structural element based on the closing-operated image; and performing erosion processing and expansion processing on an opening operation region in the binarized image sequentially according to the second structural element and a predetermined opening operation rule.

In the foregoing implementations, the boundary can be smoothed, fine spikes can be eliminated, narrow connections can be disconnected, and subsequently fine holes in the image can be eliminated; and further the noise that cannot be filtered out in the edge-preserving filtering step can be filtered out, thus achieving the filtering of most of the noise in the image.

In some possible implementations of the first aspect, the graphic symbol in the to-be-processed image is a quick code or a bar code.

In the foregoing implementations, the image containing the quick code or bar code can be restored, and the quick code or bar code in the restored image has clear outline and thus is easily recognized by a code scanning device.

According to a second aspect, an apparatus for processing graphic symbol is provided. The apparatus includes: an obtaining module, configured to obtain a luminance component image of a to-be-processed image; a binarization processing module, configured to perform binarization processing based on the luminance component image of the to-be-processed image to output a binarized image; and an operation module, configured to perform a grayscale morphological operation based on the binarized image to output a target image; where the to-be-processed image has a graphic symbol. In some possible implementations of the second aspect, the graphic symbol included in the to-be-processed image is a quick code or a bar code.

In the foregoing solution, a high-quality target image can be obtained by extracting the luminance component image of the to-be-processed image captured by an image capture device and performing binarization processing and morphological operation based on the luminance component image. In this way, the graphic outline contained in the target image is clear and less noisy, which is conducive to improving the accuracy and efficiency of subsequent graphic recognition.

In some possible implementations of the second aspect, the obtaining module is configured to: convert a color space of the to-be-processed image to a target color space according to a mapping relationship between the color space of the to-be-processed image and the target color space; and extract a luminance component image of the target color space.

In some possible implementations of the second aspect, the color space of the to-be-processed image is RGB color space or BGR color space, and the target color space is YCbCr color space, YCrCb color space, or YUV color space.

In some possible implementations of the second aspect, the obtaining module is configured to convert the color space of the to-be-processed image to the target color space according to the mapping relationship shown in the following formula:

$$Y = k_r R + k_g G + k_b B$$

where Y is the luminance value of a pixel in the luminance component image of the target color space, and R, G, and B are the red chromaticity value, green chromaticity value, and blue chromaticity value of the pixel in the to-be-processed image, respectively; and $k_r$, $k_g$, and $k_b$ are weighting factors and satisfy the following relationship:

$$k_r + k_g + k_b = 1.$$

In some possible implementations of the second aspect, the image processing apparatus further includes an image enhancement module configured to perform image enhancement on the luminance component image of the to-be-processed image before the binarization processing.

In some possible implementations of the second aspect, the image enhancement module is configured to perform enhancement on the luminance component image of the to-be-processed image using a point operation algorithm.

In some possible implementations of the second aspect, the image enhancement module is configured to perform contrast stretching on the luminance component image of the to-be-processed image.

In some possible implementations of the second aspect, the image enhancement module is configured to: traverse pixels in the luminance component image of the to-be-processed image, and determine grayscale values of all of the pixels in the luminance component image of the to-be-processed image; determine a contrast stretching function based on a grayscale range in which the grayscale values of all of the pixels in the luminance component image of the to-be-processed image fall; and perform grayscale transformation on the pixels in the luminance component image of the to-be-processed image based on the contrast stretching function.

In some possible implementations of the second aspect, the binarization processing module is configured to perform binarization processing on the enhanced image using a local adaptive binarization algorithm.

In some possible implementations of the second aspect, the binarization processing module is configured to: determine a size of a binarization processing window; traverse all pixels in the luminance component image of the to-be-processed image or in the enhanced image using the binarization processing window; calculate a sum of pixel values of all of the pixels covered by the binarization processing window; and under the condition that the sum of the pixel values is greater than or equal to a preset threshold, set a pixel value of a pixel corresponding to the center of the window to 1; otherwise set the pixel value of the pixel corresponding to the center of the window to 0.

In some possible implementations of the second aspect, the image processing apparatus further includes a filtering module configured to perform filtering on the binarized image before the morphological operation.

In some possible implementations of the second aspect, the filtering module is configured to perform edge-preserving filtering on the binarized image.

In some possible implementations of the second aspect, the filtering module is configured to convert the binarized image to an RGB image; perform color mean shift on all pixels on the RGB image; and convert the color-mean-shifted RGB image to a binarized image.

In some possible implementations of the second aspect, the operation module is configured to perform morphological closing and opening operations on the binarized image in sequence.

In some possible implementations of the second aspect, the operation module includes a closing operation unit configured to: select a first structural element based on the binarized image; and perform expansion processing and erosion processing on a closing operation region in the binarized image sequentially according to the first structural element and a predetermined closing operation rule.

In some possible implementations of the second aspect, the operation module includes an opening operation unit configured to: select a second structural element based on the closing-operated image; and perform erosion processing and expansion processing on an opening operation region in the binarized image sequentially according to the second structural element and a predetermined opening operation rule.

According to a third aspect, an apparatus for processing graphic symbol is provided. The apparatus includes a processor and a memory, where the memory is configured to store a program, and the processor is configured to call and run the program from the memory to perform the method for processing graphic symbol according to any one of the first aspect and the possible implementations of the first aspect.

According to a fourth aspect, a computer-readable storage medium is provided. The computer-readable storage medium is configured to store a computer program, where when the computer program runs on a computer, the computer is caused to perform the method for processing graphic symbol according to any one of the first aspect and the possible implementations of the first aspect.

BRIEF DESCRIPTION OF DRAWINGS

To describe the technical solutions of the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

DESCRIPTION OF EMBODIMENTS

Figure 1:
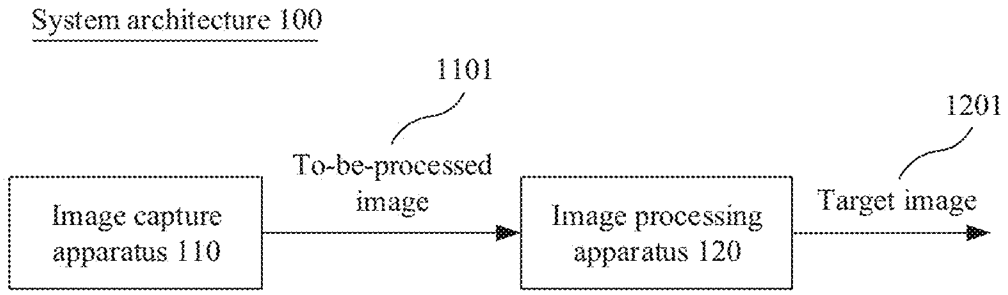
FIG. 1 is a schematic structural diagram of a system architecture.

The following further describes the implementations of this application in detail with reference to the accompanying drawings and embodiments. The detailed description of embodiments and the accompanying drawings are intended to illustrate the principle of this application, rather than to limit the scope of this application, meaning this application is not limited to the embodiments described herein. It should be understood that the specific examples herein are intended only to assist those skilled in the art to better understand the embodiments of this application, but not to limit the scope of the embodiments of this application.

It should be also understood that sequence numbers of processes in various embodiments of this application do not mean execution sequences. The execution sequences of the processes should be determined based on functions and internal logic of the processes, and should not be construed as any limitation on implementation processes of the embodiments of this application.

Unless otherwise defined, all technical and scientific terms used in the embodiments of this application have the same meanings as commonly understood by persons skilled in the art to which this application belongs. The terms used in this application are merely intended to describe specific embodiments, rather than to limit the scope of this application. The term "and/or" used in this application includes any and all combinations of one or more relevant listed items.

The embodiments of this application may be applicable to the processing of images containing features such as shapes and textures, such that information contained in the images can be more easily recognized in subsequent processes. The embodiments of this application include but are not limited to the processing of quick code images, where the images may be images captured by a charge coupled device (charge coupled device, CCD) camera, or may be images captured by another camera, or may be images captured in a manner such as screen capture. The embodiments of this application disclosed do not limit the manner in which the images are captured.

Due to the advantages such as large amount of information contained in the quick code, easy recognition, and low costs, the quick code has been rapidly developed and widely used in recent years. The quick code can be scanned to achieve a variety of functions such as information acquisition, cell phone payment, anti-counterfeit traceability, and account login. Common quick codes include a QR (Quick Response Code), a PDF (Portable Data File) 417 quick code, a data matrix (Data matrix) quick code, and the like. The data matrix quick code is a kind of industrial product-oriented quick code. This kind of quick code has the smallest size, and is currently the smallest one in all bar codes, especially suitable for small parts recognition, and directly printed on the entity. Each data matrix quick code consists of a data region, finder patterns (Finder Pattern), alignment patterns (Alignment Patterns), and blank regions. The data region consists of regularly arranged square patterns; the data region is surrounded by the finder patterns, where the finder patterns are surrounded by the blank regions; and the data region is separated by the alignment patterns. The finder patterns are the boundary of the data region, where two neighboring edges are dark solid lines, mainly used to define the physical size and positioning, and the other two neighboring edges consist of alternating dark and light patterns, mainly used to define the cell structure of the symbol, and also can assist in determining the physical size and distortion. Because the data matrix quick code requires only 20% of read data to be accurately read, it is well suitable for applications where bar codes are susceptible to damage, for example, parts exposed to special environments such as high heat, chemical cleaning agents, and mechanical stripping. Once the quick code is damaged, image restoration is required to read the information contained in it. In the prior art, grayscale processing and image enhancement are typically performed on a captured color quick code; a deep learning model is trained based on a large amount of data to restore a defaced quick code in an image region of the quick code; and then a restored quick code image is obtained and read. However, the training of the deep learning model first requires collecting a sample set and a training set, where the training set includes various types of damaged quick code images, the sample set includes clear quick code images corresponding to the damaged quick code images in the training set, and the sample set and the training set still need to go through manual classification and other processes before they can be used for the training of the model. Therefore, a deep learning method for restoring quick code images consumes a lot of time in collecting data, analyzing data, organizing data, and training the model, resulting in low efficiency; and it is highly dependent on data, and the trained model is difficult to be generalized.

In view of this, an embodiment of this application provides a method for processing graphic symbol, which uses a digital image processing method to perform luminance component extraction, image enhancement, image binarization processing, filtering, and morphological operations on a captured image containing a graphic symbol, and can display clear shape features of regions of interest on a final target image. Images can be quickly restored using this method, and data matrix quick codes in the restored images can be correctly recognized.

As shown in FIG. 1, an embodiment of this application provides a system architecture 100. In FIG. 1, an image capture device 110 is configured to input a to-be-processed image 1101 to an image processing device 120. The image capture device 110 may be any device with an image shooting or capturing function, for example, a webcam, a camcorder, a camera, a scanner, a cell phone, a tablet computer, or a code sweeper, and the to-be-processed image 1101 is an image shot or captured by the foregoing devices; or the image capture device 110 may be a device with a data storage function, and the to-be-processed image 1101 is stored in the device. The type of the image capture device 110 is not limited in this application. For the image processing method in this embodiment of this application, the to-be-processed image is an image containing a graphic symbol, and optionally, it may be an image containing a quick code or bar code. The image capture device 120 is configured to perform processing on the to-be-processed image 1101 and output a target image 1201. The target image 1201 is an image that can clearly present some specific features such as shape and texture, after processing by the image processing device 120, that is, an image that can clearly represent some features of interest to a user. Under the condition that the to-be-processed image 1101 is an image containing a quick code or bar code, the target image 1201 may be an image that can be correctly recognized by a quick code or bar code recognition device after processing. The image processing device 120 may be any device having an image processing function, for example, a computer, a smartphone, a workstation, or other devices having a central processing unit. The type of the image processing device 120 is not limited in this application.

In some implementations, the image capture device 110 may be the same device as the image processing device 120. For example, both the image capture device 110 and the image processing device 120 are smartphones or code sweepers.

In some other implementations, the image capture device 110 may be a different device from the image processing device 120. For example, the image capture device 110 is a terminal device, and the image processing device 120 is a device such as a computer and a workstation. The image capture device 110 can interact with the image processing device 120 through a communication network of any communication mechanism/communication standard, where the communication network may be a wide area network, a local area network, a point-to-point connection, or any combination thereof.

The to-be-processed image in this embodiment is a quick code image captured by an image capture device, where the image capture device may be a quick code scanning device such as a code scanning gun or may be a device such as a camera. The method is not limited to the processing of quick code images, but can also be applied to the processing of other images. The application objects of the method are not limited in this application.

Figure 2:
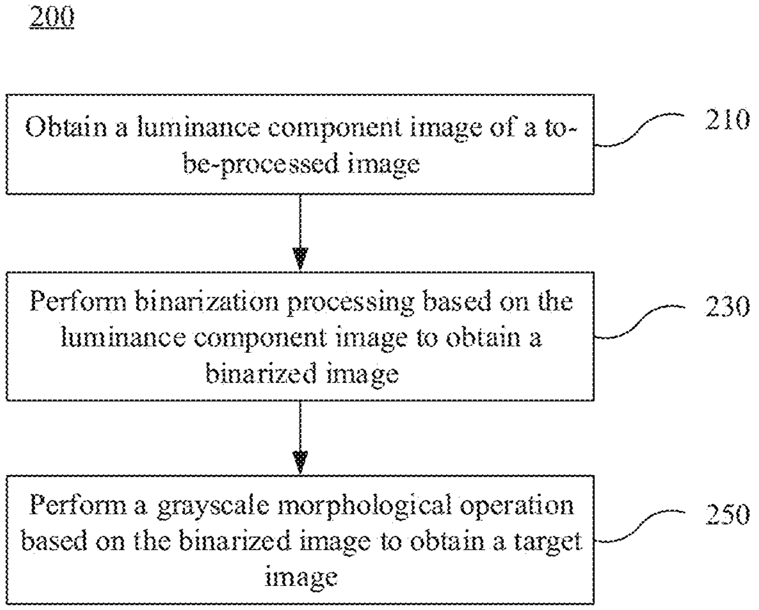
FIG. 2 is a schematic flowchart of a method for processing graphic symbol according to an embodiment of this application.
Figure 3:
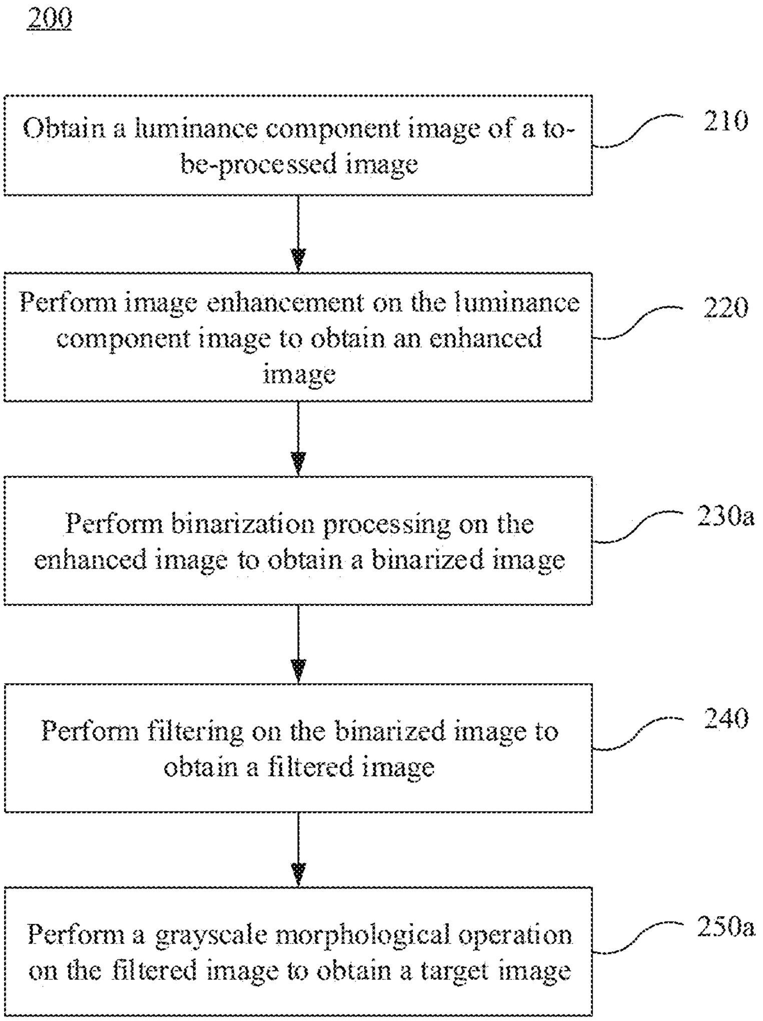
FIG. 3 is a schematic flowchart of a method for processing graphic symbol according to another embodiment of this application.

FIG. 2 and FIG. 3 are schematic flowcharts of a method 200 for processing graphic symbol according to an embodiment of this application. The method can be implemented using the image processing device 120 illustrated in FIG. 1.

210: Obtain a luminance component image of a to-be-processed image.

The luminance component image is an image that represents luminance information of a picture. Different formats of images correspond to different color spaces, and different color spaces contain different channels, for example, luminance channel and chrominance channel, where a component image corresponding to the luminance channel is a grayscale image, to be specific, an image identified with grayscale. A sampling rate of the luminance channel is higher than that of the chrominance channel. Therefore, in general, the luminance component image is the grayscale image. The grayscale image can be obtained by using a floating-point method, a component method, a maximum method, an average method, a weighted average method, or a Gamma correction algorithm, or be generated by a target color adjustment tool that comes with multimedia editing software, where the target color adjustment tool mostly generates grayscale images by performing the foregoing operation methods on images, and the grayscale images may alternatively be obtained through color space conversion.

Optionally, in some implementations of this application, the obtaining a luminance component image of a to-be-processed image in step 210 includes: converting the to-be-processed image from an original color space to a target color space, and extracting a luminance component image of the target color space to obtain the luminance component image of the to-be-processed image. The original color space is a color space in which the to-be-processed image falls, and the original color space depends on a format of the to-be-processed image and may be a color space that describes colors by colors, for example, RGB color space or BGR color space, or may be a color space that originally includes a luminance channel, for example, YUV or YCbCr, or may be other color spaces. The RGB color space and the BGR color space are two color spaces that are more commonly used in color images, where the RGB color space includes three channels, namely, channel R (Red, red), channel G (Green, green), and channel B (Blue, blue). The target color space is color space including a luminance channel, for example, YUV and YCbCr, where the YCbCr color space includes channel Y (luminance), channel Cb (blue chromaticity), and channel Cr (red chromaticity).

Under the condition that the color space of the to-be-processed image does not contain luminance information, it needs to be converted to the target color space first to extract the luminance component. Through the color space conversion, luminance and chrominance can be separated and desired information can be seen more intuitively.

Optionally, the color space conversion can be performed according to a mapping relationship between the color space of the to-be-processed image and the target color space.

Under the condition that the original color space of the to-be-processed image is the RGB color space or the BGR color space and the target color space is the YCbCr color space, the mapping relationship is shown in the following formula:

$$Y = k_r R + k_g G + k_b B$$

where Y is the luminance value of a pixel in the luminance component image of the target color space, and R, G, and B are the red chromaticity value, green chromaticity value, and blue chromaticity value of a pixel in an original image, respectively; and $k_r$, $k_g$, and $k_b$ are weighting factors and satisfy the following relationship:

$$k_r + k_g + k_b = 1.$$

In a recognition algorithm for a data matrix quick code, a mapping mode of the YCbCr color space is more intuitive and robust than a mapping mode of the RGB color space or BGR color space, and after the color space conversion, the luminance and chromaticity of the image can be separated such that the information contained in the image can be displayed more intuitively. In this way, not only can the contour features of the quick code be displayed more clearly, but it is also beneficial to the data matrix quick code recognition.

230: Perform image binarization processing based on the luminance component image of the to-be-processed image to obtain a binarized image.

The luminance component image of the to-be-processed image can be obtained by performing an operation on the to-be-processed image or by converting the to-be-processed image from the original color space to the target color space as described above. The image binarization (Image Binarization) is a procedure of determining all pixels on the image with grayscale greater than or equal to a threshold as belonging to a specific object, where the pixels are set to a grayscale value of 255; otherwise these pixels are excluded from the object region, where the pixels are set to a grayscale value of 0, indicating the background or an exceptional object region. The procedure is a procedure of rendering the entire image with a distinct black and white effect. The image binarization enables an amount of data in the image to be greatly reduced, thus enabling the outline of the object to be highlighted.

Optionally, in some implementations, the point operation algorithm may be a global fixed threshold method, a local adaptive threshold method, an OTSU (Otsu) binarization processing algorithm, or the like. The global fixed threshold method is to binarize the entire image with the same threshold value; while the local adaptive threshold method is to determine a binarization threshold at a pixel position based on pixel value distribution of a neighborhood block of a pixel.

Due to the uneven ambient lighting and other reasons, a captured original image may have significant differences in pixel grayscale in different local regions. The use of the adaptive binarization algorithm can binarize the image into a foreground part and a background part according to the grayscale features of the image so as to obtain a binarized image, which is good for reasonable binarization of local image regions with different luminance, contrast, and texture.

Optionally, in some implementations, the point operation algorithm is a local adaptive binarization algorithm.

Optionally, the adaptive binarization algorithm may be a wolf local adaptive binarization algorithm, a Niblack binarization algorithm, or a sauvola binarization algorithm.

In some implementations, the local adaptive binarization algorithm includes the following steps:

determining a size of a binarization processing window; traversing all pixels in the luminance component image of the to-be-processed image using the binarization processing window; calculating a sum of pixel values of all of the pixels covered by the binarization window; determining a grayscale threshold to be covered by the binarization processing window; and under the condition that the sum of the pixel values is greater than or equal to the grayscale threshold, setting a pixel value of a pixel corresponding to the center of the binarization processing window to 1; otherwise setting the pixel value of the pixel corresponding to the center of the binarization processing window to 0.

The grayscale threshold can be determined according to the following formula:

$$T = \frac{1}{n^2} \sum_{i=0}^{i=n-1} \sum_{j=0}^{j=n-1} v_{ij} - C$$

where T is the grayscale threshold, n is a length of a side of the binarization processing window, $v_{ij}$ is the grayscale value of the pixel in the i-th row and j-th column in the binarization processing window, and C is a constant selected depending on actual image processing requirements.

The optimal solution of the grayscale threshold T can be found by using a single variable control method, the Bayesian optimization method, or other parametric optimization methods.

In this embodiment, the adaptive binarization algorithm is used to binarize the enhanced image, and the binarization threshold at each pixel position is not fixed but determined by the distribution of its surrounding neighborhood pixels, which enables image regions with higher luminance to have higher binarization thresholds and image regions with lower luminance to have relatively lower binarization thresholds. It can be seen from (c) and (d) in FIG. 6 that the outline of the binarized image after local adaptive binarization are clearer than that of the enhanced image.

250: Perform a grayscale morphological operation based on the binarized image to obtain a target image.

The grayscale morphological operation includes erosion, expansion, opening operation, and closing operation, by which parameters such as grayscale value and spatial dimension of the original image can be adjusted.

Optionally, the grayscale morphological operations in step 250 may be morphological closing and opening operations sequentially performed based on the binarized image.

The closing operation includes: selecting a first structural element based on the binarized image; and performing expansion processing and erosion processing on a closing operation region in the binarized image sequentially according to the first structural element and a predetermined closing operation rule.

The opening operation includes: selecting a second structural element based on the opening-operated image; and performing erosion processing and expansion processing on an opening operation region in the binarized image sequentially according to the second structural element and a predetermined opening operation rule.

Structural elements are basic elements in morphological transformations, and are designed to detect some structural information of an image with a specific shape and size. The structural elements can be circular, square, linear, and the like, and can carry information such as morphology, size, grayscale, and chromaticity. In the image processing, the structural element can be regarded as a two-dimensional matrix in which a value of the matrix element is "0" or "1". In general, a size of the structural element is smaller than a size of the to-be-processed image. In this embodiment of this application, the first structural element and the second structural element may be the same structural element or may be different structural elements, and the size of the structural element can be adjusted depending on actual image processing effects. The closing operation region and the opening operation region may be the entire region in which the foregoing binarized image is located or may be a partial region of the binarized image. For example, a region with blurred outline or much noise can be selected as the closing operation region and/or the opening operation region.

Optionally, in some implementations of this application, before step 230, the foregoing image processing method may further include the following step:

220: Perform image enhancement on the luminance component image of the to-be-processed image to obtain a luminance component image of the enhanced to-be-processed image.

Image enhancement refers to improving visual effect of an image for application scenarios of the image so as to meet the needs of some special analysis. Optionally, image enhancement can be performed using a spatial domain-based algorithm, such as a point operation algorithm or a neighborhood denoising algorithm; or image enhancement can be performed using a frequency domain-based algorithm.

Optionally, in step 220, the luminance component image of the to-be-processed image may be enhanced using a point operation algorithm.

Optionally, the performing enhancement on the luminance component image of the to-be-processed image using a point operation algorithm may be performing contrast stretching on the luminance component image of the to-be-processed image or performing grayscale histogram shifting on the luminance component image of the to-be-processed image.

Optionally, the method used for contrast stretching may be a linear stretching method, to be specific, pixel values of the luminance component image of the to-be-processed image are linearly scaled. According to some embodiments of this application, optionally, the luminance component image of the to-be-processed image can be linearly stretched through full domain linear stretching, 2% linear stretching, segmented linear stretching, grayscale window slice, or the like.

Optionally, the method used for contrast stretching may be a nonlinear stretching method, to be specific, the image is stretched using a nonlinear function, and optionally, according to some embodiments of this application, the luminance component image of the to-be-processed image may be stretched nonlinearly using a function such as an exponential function, a logarithmic function, or a Gaussian function.

In some implementations of this application, the contrast stretching procedure can be expressed in the following formula:

$$I(x, y) = \frac{I(x, y) - I_{min}}{I_{max} - I_{min}}(\mathrm{MAX} - \mathrm{MIN}) + \mathrm{MIN}$$

where I(x,y) is a grayscale value of a pixel in the luminance component image of the to-be-processed image, (x,y) is coordinates of the pixel, $I_{min}$ is the minimum grayscale value of the luminance component image of the to-be-processed image, Imax is the maximum grayscale value of the luminance component image of the to-be-processed image, and MIN and MAX are the minimum and maximum grayscale values of the gray space to be stretched to; and optionally, the minimum value may be 0 and the maximum value may be 255.

Optionally, in some implementations, step 220 may be dispensed under the condition that the luminance component image of the to-be-processed image obtained in step 210 is clear or sufficient information is provided.

Optionally, in some other implementations, under the condition that the luminance component image of the to-be-processed image has low quality or is blurred, before step 230, the luminance component image of the to-be-processed image can be enhanced through step 220 to increase a difference between different object features in the image and to restrain the uninteresting features, so as to improve the image quality and enhance the subsequent image interpretation and recognition. In this case, step 230 may include step 230*a* as shown in FIG. 3.

230*a*: Perform binarization processing on the luminance component image of the enhanced to-be-processed image to obtain the binarized image.

Optionally, in some implementations of this application, before step 250, the foregoing image processing method may further include:

240: Perform filtering on the binarized image to obtain a filtered binarized image.

Specifically, in step 240, the performing edge-preserving filtering on the binarized image can filter out as much noise as possible while retaining more edge details.

In some possible implementations, the performing edge-preserving filtering on the binarized image includes: converting the binarized image to an RGB image; performing color mean shift on all pixels on the RGB image; and converting the color-mean-shifted RGB image to a binarized image.

In the foregoing implementations, the binarized image can be made smoother, and a calculation amount of the morphological operation can be reduced.

The performing color mean shift on all pixels on the RGB image includes: determining a physical space radius and a color space radius for establishing an iteration space; establishing a spatial sphere based on the physical space radius and the color space radius with any one of the pixels on the RGB image as an initial center point; using the spatial sphere as the iteration space, and calculating a vector sum of vectors of all of the pixels in the iteration space relative to the center point; moving the center point to the end point of the vector sum, calculating a vector sum again until the end point of the vector sum coincides with the center point, and using the end point of the vector sum as the final center point; and updating a color value of the initial center point to a color value of the final center point.

In some implementations of this application, step 240 may be dispensed with under the condition that the binarized image obtained in step 230 has high quality and less noise.

In some implementations of this application, under the condition that there are more noise in the binarized image obtained in step 230, the filtering operation can be performed on the binarized image through step 240 before step 250, such that the noise that is easier to eliminate in the image can be eliminated through the filtering operation, thereby reducing the amount of operations in step 250 and enhancing the denoising effect. In this case, step 250 may include step 250*a* as shown in FIG. 3.

250*a*: Perform morphological opening and closing operations on the filtered binarized image in sequence.

Figure 4:
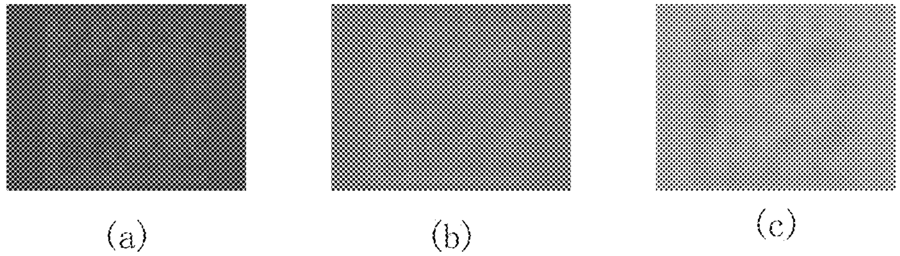
FIG. 4 shows an image of components of a target color space in a method for processing graphic symbol according to an embodiment of this application.
Figure 5:
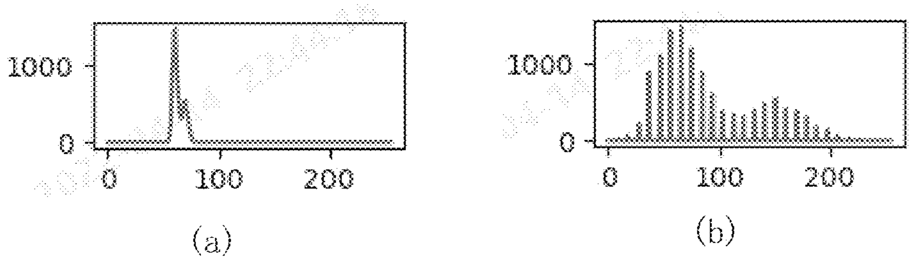
FIG. 5 is a grayscale histogram before and after contrast stretching in a method for processing graphic symbol according to an embodiment of this application.

In the embodiments shown in FIG. 4 to FIG. 6, the foregoing image processing method is applied to the processing of DataMatrix quick code images, where the to-be-processed image is a color quick code image input from an image capture device, and the color space is the RGB color space; and the processing steps are as follows.

Step 1: Convert a color quick code image from RGB color space to YCbCr color space, and separate component Y, component Cb, and component Cr, and extract a quick code image of component Y, that is, the luminance component image of the quick code to-be-processed image. FIG. 4 shows images of three components after the color space of the Data Matrix quick code image is converted into the YCbCr color space using the method for processing graphic symbol according to this application, where (a) is the image of component Y, (b) is the image of component Cb, and (c) is the image of component Cr. It can be seen from FIG. 4 that the image of component Y contains more sufficient information than the images of the other two components. FIG. 5 is a process diagram of a method for processing the Data Matrix quick code image according to an embodiment of this application, where (a) is the to-be-processed image and (b) is an image of channel Y extracted after the color space conversion, and it can be seen from (a) and (b) in FIG. 6 that component Y can provide more sufficient information. Therefore, in this embodiment, the separation of the three components from the YCbCr color space and the extraction of the image of component Y as the basic image for the subsequent operations are more conducive to subsequent image processing and quick code recognition.

Step 2: Perform image enhancement on the quick code image of component Y using the contrast stretching method, to increase a grayscale difference between foreground and background and obtain a stretched quick code image, that is, a grayscale image. FIG. 5 shows grayscale histograms of the data matrix quick code image before and after the image enhancement, where (a) is the grayscale histogram of the Y-channel component image before the contrast stretching, and (b) is the grayscale histogram of the enhanced image obtained after the contrast stretching. It can be seen from FIG. 5 that the image before contrast stretching has a more concentrated grayscale, so it is difficult to represent the texture and shape features in the image; while the image after contrast stretching has grayscale values scattered within the range of 0 to 255, enhancing the contrast. (c) in FIG. 6 is the enhanced image obtained after the contrast stretching. It can be seen from (b) and (c) in FIG. 6 that the image before the contrast stretching is blurred, while the enhanced image after the contrast stretching is clearer and can represent more texture and shape features contained in the image, which is beneficial to the recognition of quick codes.

Step 3: Perform local adaptive binarization on the stretched quick code image, and divide the image into two parts, foreground and background, according to the grayscale features of the image to obtain a binarized quick code image. (d) in FIG. 6 is a binarized image obtained after the binarization processing. It can be seen that the image contains more noise, which interferes with the subsequent recognition procedure. Therefore, for the features of the DataMatrix quick code image, edge-preserving filtering is performed on the image to initially filter out the noise while improving the clarity of the edges of the image.

Step 4: Perform edge-preserving filtering on the binarized quick code image to filter out as much noise as possible while retaining more edge details, so as to obtain the filtered quick code image. (e) in FIG. 6 is the filtered image obtained after the filtering. It can be seen from (d) and (e) in FIG. 6 that noise in the outline of the filtered image obtained after the edge-preserving filtering is reduced compared with the noise in the binarized image. However, although some of the noise has been filtered out, there are still small spikes, voids, and other small noise in the image. Therefore, in the next step, a morphological operation is performed on the quick code to filter out the small noise in the image.

Step 5: Perform morphological closing operation and opening operations on the filtered quick code image in sequence to obtain the target quick code image. In this embodiment, the quick code after the morphological operation is the clearest when sizes of the first structural element and the second structural element are both 3×3.

Figure 6:
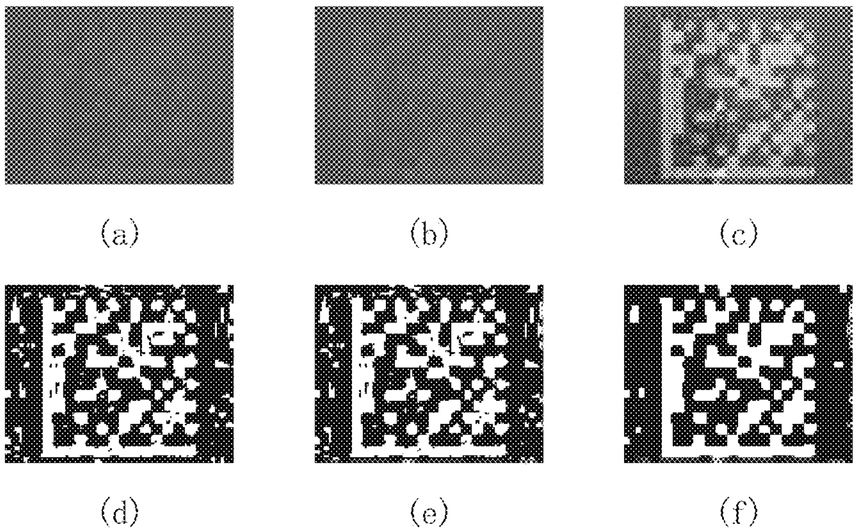
FIG. 6 shows a procedure image of a method for processing graphic symbol according to an embodiment of this application.

(f) in FIG. 6 is the target image obtained after the image morphological operation; and it can be seen from (e) and (f) in FIG. 6 that the target image obtained after the morphological opening and closing operations has a clear outline and there is almost no noise that affects the quick code recognition in the image. After a series of processing by the foregoing method, the fuzzy quick code image becomes clear, such that it can be recognized by a code scanning device.

The method embodiment of the embodiments of this application has been described in detail above, and the apparatus embodiment of the embodiments of this application is described below. The apparatus embodiment and the method embodiment correspond to each other, and therefore for content not described in detail, reference may be made to the previous method embodiment. The apparatus can implement any possible embodiment of the foregoing method.

Figure 7:
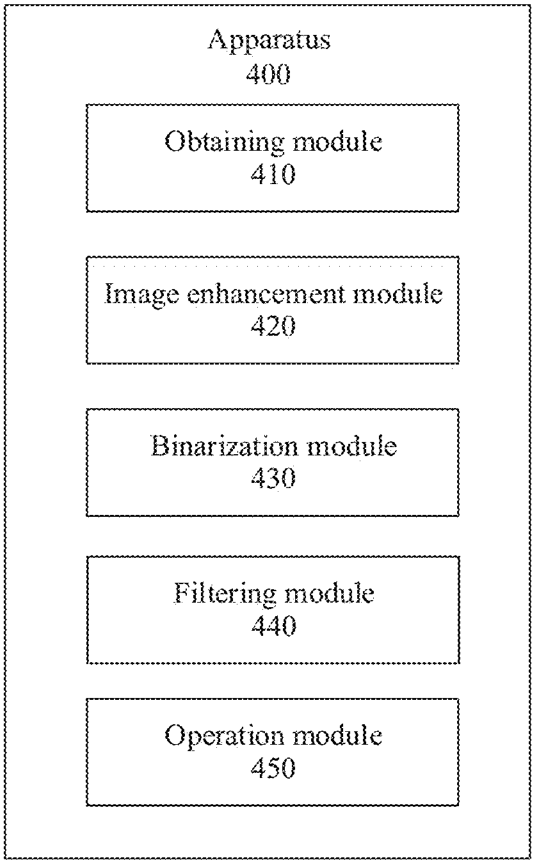
FIG. 7 is a schematic structural block diagram of an apparatus for processing graphic symbol according to an embodiment of this application.

FIG. 7 is a schematic block diagram of an apparatus 400 for processing graphic symbol according to an embodiment of this application. The apparatus 400 includes: an obtaining module 410, configured to obtain a luminance component image of a to-be-processed image; a binarization processing module 430, configured to perform binarization processing based on the luminance component image of the to-be-processed image to output a binarized image; and an operation module 450, configured to perform a grayscale morphological operation based on the binarized image to output a target image.

In the foregoing solution, a high-quality target image can be obtained by extracting the luminance component image of the to-be-processed image captured by an image capture device and performing binarization processing and morphological operation based on the luminance component image. In this way, the graphic outline contained in the target image is clear and less noisy, which is conducive to improving the accuracy and efficiency of subsequent graphic recognition.

Optionally, in some embodiments, the obtaining module 410 is configured to: convert a color space of the to-be-processed image to a target color space according to a mapping relationship between the color space of the to-be-processed image and the target color space; and extract a luminance component image of the target color space.

Optionally, in some embodiments, the color space of the to-be-processed image is RGB color space or BGR color space, and the target color space is YCbCr color space, YCrCb color space, or YUV color space.

Optionally, in some embodiments, the obtaining module 410 is configured to convert the color space of the to-be-processed image to the target color space according to the mapping relationship shown in the following formula:

$$Y = k_r R + k_g G + k_b B$$

where Y is the luminance value of a pixel in the luminance component image of the target color space, and R, G, and B are the red chromaticity value, green chromaticity value, and blue chromaticity value of the pixel in the to-be-processed image, respectively; and $k_r$, $k_g$, and $k_b$ are weighting factors and satisfy the following relationship:

$$k_r + k_g + k_b = 1.$$

Optionally, in some embodiments, the image processing apparatus 400 further includes an image enhancement module 420 configured to: perform image enhancement on the luminance component image of the to-be-processed image and output the enhanced image.

Optionally, in some embodiments, the image enhancement module 420 is configured to perform enhancement on the luminance component image of the to-be-processed image using a point operation algorithm.

Optionally, in some embodiments, the image enhancement module 420 is configured to perform contrast stretching on the luminance component image of the to-be-processed image.

Optionally, in some embodiments, the image enhancement module 420 is configured to: traverse pixels in the luminance component image of the to-be-processed image, and determine grayscale values of all of the pixels in the luminance component image of the to-be-processed image; determine a contrast stretching function based on a grayscale range in which the grayscale values of all of the pixels in the luminance component image of the to-be-processed image fall; and perform grayscale transformation on the pixels in the luminance component image of the to-be-processed image based on the contrast stretching function.

Optionally, in some embodiments, the binarization processing module 430 is configured to perform binarization processing on the enhanced image using a local adaptive binarization algorithm.

Optionally, in some embodiments, the binarization processing module is configured to:

determine a size of a binarization processing window; traverse all pixels in the luminance component image of the to-be-processed image using the binarization processing window; calculate a sum of pixel values of all of the pixels covered by the binarization window; determine a grayscale threshold to be covered by the binarization processing window; and under the condition that the sum of the pixel values is greater than or equal to the grayscale threshold, set a pixel value of a pixel corresponding to the center of the binarization processing window to 1; otherwise set the pixel value of the pixel corresponding to the center of the binarization processing window to 0.

The grayscale threshold can be determined according to the following formula:

$$T = \frac{1}{n^2} \sum_{i=0}^{i=n-1} \sum_{j=0}^{j=n-1} v_{ij} - C$$

where T is the grayscale threshold, n is a length of a side of the binarization processing window, $v_{ij}$ is the grayscale value of the pixel in the i-th row and j-th column in the binarization processing window, and C is a constant selected depending on actual image processing requirements.

Optionally, in some embodiments, the image processing apparatus 400 further includes a filtering module 440 configured to perform filtering on the binarized image.

Optionally, in some embodiments, the filtering module 440 is configured to perform edge-preserving filtering on the binarized image.

Optionally, in some embodiments, the operation module 450 is configured to perform morphological closing and opening operations on the binarized image in sequence.

Optionally, in some embodiments, the operation module 450 includes a closing operation unit configured to: select a first structural element based on the binarized image; and perform expansion processing and erosion processing on a closing operation region sequentially according to the first structural element and a predetermined closing operation rule.

Optionally, in some embodiments, the operation module 450 includes an opening operation unit configured to: select a second structural element based on the closing-operated image; and perform erosion processing and expansion processing on an opening operation region sequentially according to the second structural element and a predetermined opening operation rule.

Figure 8:
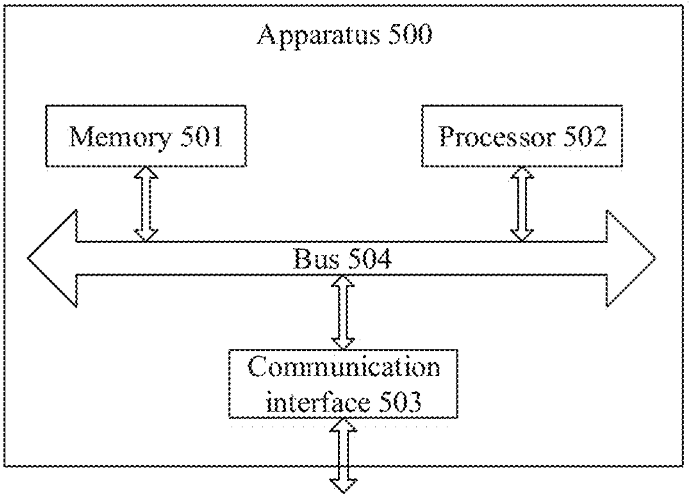
FIG. 8 is a schematic structural block diagram of an apparatus for processing graphic symbol according to an embodiment of this application.

FIG. 8 is a schematic diagram of a hardware structure of an apparatus for processing graphic symbol according to an embodiment of this application. The apparatus 500 for processing graphic symbol shown in FIG. 5 includes a memory 501, a processor 502, a communication interface 503, and a bus 504. Communication connections between the memory 501, the processor 502, and the communication interface 503 are implemented by using the bus 504.

The memory 501 may be a read-only memory (read-only memory, ROM), a static storage device, a random access memory (random access memory, RAM), or the like. The memory 501 may store a program. When the program stored in the memory 501 is executed by the processor 502, the processor 502 and the communication interface 503 are configured to execute the steps of the method for processing graphic symbol according to the embodiments of this application.

The processor 502 may be a general-purpose central processing unit (central processing unit, CPU), a microprocessor, an application-specific integrated circuit (application specific integrated circuit, ASIC), a graphics processing unit (graphics processing unit, GPU), or one or more integrated circuits, and is configured to execute a related program, so as to implement functions that need to be executed by the units in the apparatus for processing graphic symbol according to this embodiment of this application, or execute the method for processing graphic symbol according to the embodiments of this application.

The processor 502 may alternatively be an integrated circuit chip with a signal processing capability. During implementation, the steps of the method for processing graphic symbol according to this embodiment of this application may be completed by hardware integrated logic circuits in the processor 502 or instructions in the form of software.

The processor 502 may be a general-purpose processor, a digital signal processor (digital signal processing, DSP), an ASIC, a field programmable gate array (field programmable gate array, FPGA) or other programmable logic device, a discrete gate or transistor logic device, or a discrete hardware component. The methods, steps, and logical block diagrams disclosed in the embodiments of this application can be implemented or performed. The general-purpose processor may be a microprocessor or any conventional processor. The steps of the method disclosed with reference to the embodiments of the application may be directly implemented by a hardware processor, or may be implemented by a combination of hardware and a software module in a processor. The software module may be located in a storage medium mature in the art, such as a random access memory, a flash memory, a read-only memory, a programmable read-only memory or electrically erasable programmable memory, or a register. The storage medium is located in the memory 501. The processor 502 reads information from the memory 501, and in combination with hardware of the processor 502, performs functions that need to be performed by the units included in the apparatus for processing graphic symbol according to this embodiment of this application, or perform the method for processing graphic symbol according to the embodiments of this application.

A transceiver apparatus such as, without limitation, a transceiver is used at the communication interface 503, to implement communication between the apparatus 500 and another device or a communication network. For example, traffic data of an unknown device may be obtained through the communication interface 503.

The bus 504 may include a path for transferring information between various components of the apparatus 500 (for example, the memory 501, the processor 502, and the communication interface 503).

It should be noted that although only the memory, the processor, and the communication interface of the apparatus 500 are shown, in specific implementation, persons skilled in the art should understand that the apparatus 500 may further include other components necessary for normal operation. In addition, persons skilled in the art should understand that based on specific needs, the apparatus 500 may further include a hardware component for implementing other additional functions. In addition, persons skilled in the art should understand that the apparatus 500 may include only components necessary for implementing the embodiments of this application, and does not necessarily include all the components shown in FIG. 5.

An embodiment of this application further provides a computer-readable storage medium, where the storage medium stores program code for execution by a device, and the program code includes instructions for performing the steps in the foregoing method for processing graphic symbol.

An embodiment of this application further provides a computer program product, where the computer program product includes a computer program stored on a computer-readable storage medium, the computer program includes program instructions, and when the program instruction are executed by a computer, the computer is caused to perform the foregoing method for processing graphic symbol.

The computer-readable storage medium described above may be a transient computer-readable storage medium or a non-transient computer readable storage medium.

It may be clearly understood by persons skilled in the art that, for the purpose of convenient and brief description, for a detailed working process of the foregoing apparatus, reference may be made to a corresponding process in the foregoing method embodiments, and details are not described again herein.

In the several embodiments provided in this application, it should be understood that the disclosed apparatus and method may be implemented in other manners. For example, the described apparatus embodiments are merely illustrative. For example, the unit division is merely logical function division and other division manners may be used in actual implementation. For example, a plurality of units or components may be combined or integrated into another system, or some features may be ignored or not be performed. In addition, the displayed or discussed mutual couplings, direct couplings or communication connections may be indirect couplings or communication connections through some interfaces, apparatuses or units, and may be in electrical, mechanical, or other forms.

The terms used in this application are merely used to describe the embodiments and not to limit the claims. As used in the description of the embodiments and the claims, unless otherwise clearly stated in the context, singular forms "a/an" and "the" also include plural forms. Similarly, the term "and/or" as used in this application intends to include any and all possible combinations of one or more of associated listed items. In addition, when used in this application, the term "include" specifies that the stated features, integers, steps, operations, elements, and/or components exist, but does not preclude that one or more other features, integers, steps, operations, elements, components, and/or groupings thereof exist or are added.

The aspects, implementations, or features of the described embodiments can be used alone or in any combination. The aspects of the described embodiments may be implemented by software, hardware, or a combination of software and hardware. The described embodiments may alternatively be embodied by a computer-readable medium that stores computer-readable code. The computer-readable code includes instructions executable by at least one computing apparatus. The computer-readable medium may be associated with any data storage apparatus that can store data. The data can be accessed by a computer system. An example computer-readable medium may include read-only memory, random access memory, compact disc read-only memory (Compact Disc Read-Only Memory, CD-ROM), hard disk drive (Hard Disk Drive, HDD), digital video disc (Digital Video Disc, DVD), magnetic tape, optical data storage apparatus, or the like. The computer-readable medium may alternatively be distributed over a computer system connected via a network so that the computer-readable code can be stored and executed in a distributed manner.

The foregoing technical description may refer to the accompanying drawings that are a part of this application and presents the implementation in accordance with the described embodiments in the accompanying drawings. Although these embodiments are described in sufficient detail to enable persons skilled in the art to implement the embodiments, these embodiments are not limitative so that other embodiments can be used. In addition, modifications may further be made without departing from the scope of the described embodiments. For example, the operation order described in the flowcharts is not limitative, and therefore the order of two or more operations illustrated in and described in accordance with the flowchart may be changed based on several embodiments. For another example, in several embodiments, one or more operations illustrated in and described in accordance with the flowchart are optional, or may be deleted. In addition, some steps or functionalities may be added to the disclosed embodiments, or two or more steps may be permuted. All such variations are considered to be encompassed by the disclosed embodiments and the claims.

Additionally, terms are used in the foregoing technical description to provide a thorough understanding of the described embodiments. However, undue detail is not required to implement the described embodiments. Thus, the foregoing description of the embodiments is presented for purposes of illustration and description. The embodiments presented in the foregoing description, and examples disclosed in accordance with these embodiments are provided to offer context and facilitate understanding of the described embodiments. The foregoing description is not intended to be exhaustive or limit this application to the described embodiments in a precise form. Several modifications, alternatives, and variations are possible in accordance with the foregoing teachings. In some instances, well-known process steps have not been described in detail so as not to unnecessarily obscure the described embodiments. Although this application has been described with reference to some preferred embodiments, various modifications to this application and replacements of the components therein with equivalents can be made without departing from the scope of this application. In particular, as long as there is no structural conflict, the various technical features mentioned in the embodiments can be combined in any manner. This application is not limited to the specific embodiments disclosed in this specification but includes all technical solutions falling within the scope of the claims.

The invention claimed is:

1. A method for processing a graphic symbol, comprising:

obtaining a luminance component image of a to-be-processed image including the graphic symbol, the graphic symbol comprising at least one of a data matrix quick code and a portable data file (PDF) quick code, wherein luminance of the luminance component image corresponds to a luminance channel and chromaticity of the to-be-processed image corresponds to a chrominance channel, the luminance channel having a sampling rate higher than the chrominance channel, and the obtaining the luminance component image of the to-be-processed image includes converting a color space of the to-be-processed image to a target color space for separating the luminance and the chromaticity for improved recognition of the graphic symbol;

performing binarization processing based on the luminance component image of the to-be-processed image to obtain a binarized image; and performing a grayscale morphological operation based on the binarized image to obtain a target image.

2. The method according to claim 1, wherein:

the converting of the color space of the to-be-processed image to the target color space is according to a mapping relationship between the color space of the to-be-processed image and the target color space.

3. The method according to claim 2, wherein;

the color space of the to-be-processed image is i) a red, green, and blue (RGB) color space or ii) a blue, green, and red (BGR) color space, and the target color space is a) a luminance, blue chromaticity, and red chromaticity (YCbCr) color space, b) a luminance, red chromaticity, and blue chromaticity (YCrCb) color space, or c) a luminance, blue luminance, and red luminance (YUV) color space.

4. The method according to claim 2, wherein the mapping relationship between the color space of the to-be-processed image and the target color space is shown in the following formula:

$$Y = k_r R + k_g G + k_b B;$$

wherein Y is the luminance value of a pixel in the luminance component image of the target color space, and R, G, and B are a red chromaticity value, green chromaticity value, and blue chromaticity value of the pixel in the to-be-processed image, respectively; and $k_r$, $k_g$, and $k_b$ are weighting factors and satisfy the following relationship:

$$k_r + k_g + k_b = 1.$$

5. The method according to claim 1, wherein the obtaining the luminance component image comprises:

converting the color space of the to-be-processed image from i) a red, green, and blue (RGB) color space or ii) a blue, green, and red (BGR) color space to the target color space, the target color space is selected from a) a luminance, blue chromaticity, and red chromaticity (YCbCr) color space, b) a luminance, red chromaticity, and blue chromaticity (YCrCb) color space, or c) a luminance, blue luminance, and red luminance (YUV) color space; and the converting of the color space of the to-be-processed image to the target color space is according to a mapping relationship between the color space of the to-be-processed image and the target color space, wherein the mapping relationship between the color space of the to-be-processed image and the target color space is shown in the following formula:

$$Y = k_r R + k_g G + k_b B; \text{ and}$$

Y is the luminance value of a pixel in the luminance component image of the target color space, and R, G, and B are a red chromaticity value, green chromaticity value, and blue chromaticity value of the pixel in the to-be-processed image, respectively; and $k_r$, $k_g$, and $k_b$ are weighting factors and satisfy the following relationship:

$$k_r + k_g + k_b = 1.$$

6. The method according to claim 5, further comprising: recognizing that the graphic symbol includes the data matrix quick code using the YCbCr color space.

7. The method according to claim 1, wherein:

in response to the luminance component image having reduced quality or being blurred, the method further includes performing image enhancement on the luminance component image prior to the binarization processing to increase a difference between different object features in the luminance component image.

8. The method according to claim 1, wherein before the performing binarization processing based on the luminance component image of the to-be-processed image, the method further comprises:

performing contrast stretching on the luminance component image of the to-be-processed image.

9. The method according to claim 8, wherein the performing contrast stretching on the luminance component image comprises:

traversing pixels in the luminance component image of the to-be-processed image, and determining grayscale values of all of the pixels in the luminance component image of the to-be-processed image;

determining a contrast stretching function based on a grayscale range in which the grayscale values of all of the pixels in the luminance component image of the to-be-processed image are distributed; and performing grayscale transformation on the pixels in the luminance component image of the to-be-processed image based on the contrast stretching function.

10. The method according to claim 1, wherein the performing binarization processing based on the luminance component image comprises:

performing binarization processing on the luminance component image of the to-be-processed image using a local adaptive binarization algorithm.

11. The method according to claim 10, wherein the performing binarization processing on the luminance component image using the local adaptive binarization algorithm comprises:

determining a size of a binarization processing window;

traversing all pixels in the luminance component image of the to-be-processed image using the binarization processing window;

determining a grayscale threshold to be covered by the binarization processing window; and under a condition that a sum of pixel values of all of the pixels in the luminance component image of the to-be-processed image is greater than or equal to the grayscale threshold, setting a pixel value of a pixel corresponding to a center of the binarization processing window to 1; otherwise setting the pixel value of the pixel corresponding to the center of the binarization processing window to 0.

12. The method according to claim 11, wherein the grayscale threshold is determined according to the following formula:

$$T = \frac{1}{n^2} \sum_{i=0}^{i=n-1} \sum_{j=0}^{j=n-1} v_{ij} - C$$

wherein T is the grayscale threshold, n is a length of a side of the binarization processing window, $V_{ij}$ is the grayscale value of the pixel in the i-th row and j-th column in the binarization processing window, and C is a constant term.

13. The method according to claim 1, wherein before the performing the grayscale morphological operation based on the binarized image, the method further comprises:

performing edge-preserving filtering on the binarized image.

14. The method according to claim 1, wherein the performing the grayscale morphological operation based on the binarized image comprises:

performing morphological closing and opening operations on the binarized image in sequence.

15. The method according to claim 14, wherein the closing operation comprises:

selecting a first structural element based on the binarized image; and performing expansion processing and erosion processing on a closing operation region in the binarized image sequentially according to the first structural element and a predetermined closing operation rule; and the opening operation comprises:

selecting a second structural element based on the closing-operated image; and performing erosion processing and expansion processing on an opening operation region in the binarized image sequentially according to the second structural element and a predetermined opening operation rule.

16. An apparatus for processing a graphic symbol, comprising:

circuitry configured to:

obtain a luminance component image of a to-be-processed image including the graphic symbol, the graphic symbol comprising at least one of a data matrix quick code and a portable data file (PDF) quick code, wherein luminance of the luminance component image corresponds to a luminance channel and chromaticity of the to-be-processed image corresponds to a chrominance channel, the luminance channel having a sampling rate higher than the chrominance channel, and the obtaining the luminance component image of the to-be-processed image includes converting a color space of the to-be-processed image to a target color space for separating the luminance and the chromaticity for improved recognition of the graphic symbol;

perform binarization processing based on the luminance component image of the to-be-processed image to output a binarized image; and perform a grayscale morphological operation based on the binarized image to output a target image.

17. An apparatus for processing a graphic symbol, comprising a processor and a memory, wherein the memory is configured to store a program, and the processor is configured to call and run the program from the memory so as to perform the method for processing the graphic symbol according to claim 1.

18. A non-transitory computer-readable storage medium, the non-transitory computer-readable storage medium comprising:

a computer program stored in the medium; and when the computer program runs on a computer, the computer is caused to perform a method for processing a graphic symbol, the method including:

obtaining a luminance component image of a to-be-processed image including the graphic symbol, the graphic symbol comprising at least one of a data matrix quick code and a portable data file (PDF) quick code, wherein luminance of the luminance component image corresponds to a luminance channel and chromaticity of the to-be-processed image corresponds to a chrominance channel, the luminance channel having a sampling rate higher than the chrominance channel, and the obtaining the luminance component image of the to-be-processed image includes converting a color space of the to-be-processed image to a target color space for separating the luminance and the chromaticity for improved recognition of the graphic symbol;

performing binarization processing based on the luminance component image of the to-be-processed image to obtain a binarized image; and performing a grayscale morphological operation based on the binarized image to obtain a target image.

* * * * *